United States Patent
Araujo Da Silva et al.

(10) Patent No.: US 7,576,153 B2
(45) Date of Patent: Aug. 18, 2009

(54) TIRE RUBBER COMPOSITION COMPRISING A COUPLING AGENT HAVING A POLYTHIOSULFENAMIDE FUNCTION

(75) Inventors: Carlos José Araujo Da Silva, Pont-du-Chateau (FR); Christiane Blanchard, Chateaugay (FR); Gérard Mignani, Lyons (FR); Salvatore Pagano, Gunma-ken (JP); Jean-Claude Tardivat, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 398 days.

(21) Appl. No.: 10/870,999

(22) Filed: Jun. 21, 2004

(65) Prior Publication Data
US 2005/0032949 A1   Feb. 10, 2005

Related U.S. Application Data

(63) Continuation of application No. PCT/EP02/14522, filed on Dec. 19, 2002.

(30) Foreign Application Priority Data

Dec. 20, 2001 (FR) .................................. 01 16853

(51) Int. Cl.
*B60C 1/00* (2006.01)
*C08K 5/44* (2006.01)
*C08K 5/5415* (2006.01)

(52) U.S. Cl. ........................ 524/262; 524/261; 524/492; 524/495; 524/571

(58) Field of Classification Search .................. 524/262
See application file for complete search history.

(56) References Cited

U.S. PATENT DOCUMENTS 4,292,234 A * 9/1981 Borel .......................... 524/565
6,399,706 B1   6/2002 Obrecht et al.
6,815,473 B2 * 11/2004 Robert et al. ................ 523/215

FOREIGN PATENT DOCUMENTS

| EP | 0 074 632 | 3/1983 |
|---|---|---|
| EP | 0 939 081 | 9/1999 |
| EP | 0 945 456 | 9/1999 |
| EP | 1 063 259 | 12/2000 |
| WO | WO 0192402 A1 * | 12/2001 |

OTHER PUBLICATIONS

Lewis, Sr., Richard J. Hawley's Condensed Chemical Dictionary, 12$^{th}$ Edition, 1993, p. 930.*

* cited by examiner

*Primary Examiner*—Vickey Nerangis
(74) *Attorney, Agent, or Firm*—Buchanan Ingersoll & Rooney PC

(57) ABSTRACT

An elastomeric composition usable for the manufacture of tires, based on at least (i) a diene elastomer, (ii) an inorganic filler as reinforcing filler and (iii), as (inorganic filler/diene elastomer) coupling agent, a organosilicon compound which is at least bifunctional and can be grafted on to the elastomer by means of a sulfur group having a polythiosulfenamide function, of formula:

$$\equiv Si-A-S_x-NR^1R^2, \qquad (I)$$

in which:
A is a divalent bond group, whether straight-chain or branched, which makes it possible to join the polythiosulfenamide group to a silicon atom of the organosilicon compound;
x is an integer or fractional number of from 2 to 4;
$R^1$ represents hydrogen or a monovalent hydrocarbon group;
$R^2$ represents a monovalent hydrocarbon group selected from among $C_3$-$C_8$ alkyls, whether straight-chain or branched, $C_5$-$C_{10}$ cycloalkyls, $C_6$-$C_{18}$ aryls and ($C_6$-$C_{18}$)aryl-($C_1$-$C_8$)alkyls;
$R^1$ and $R^2$ possibly forming together and with the nitrogen atom to which they are bonded a single hydrocarbon ring.

Tires and tire treads comprising a composition of this type.

5 Claims, 1 Drawing Sheet

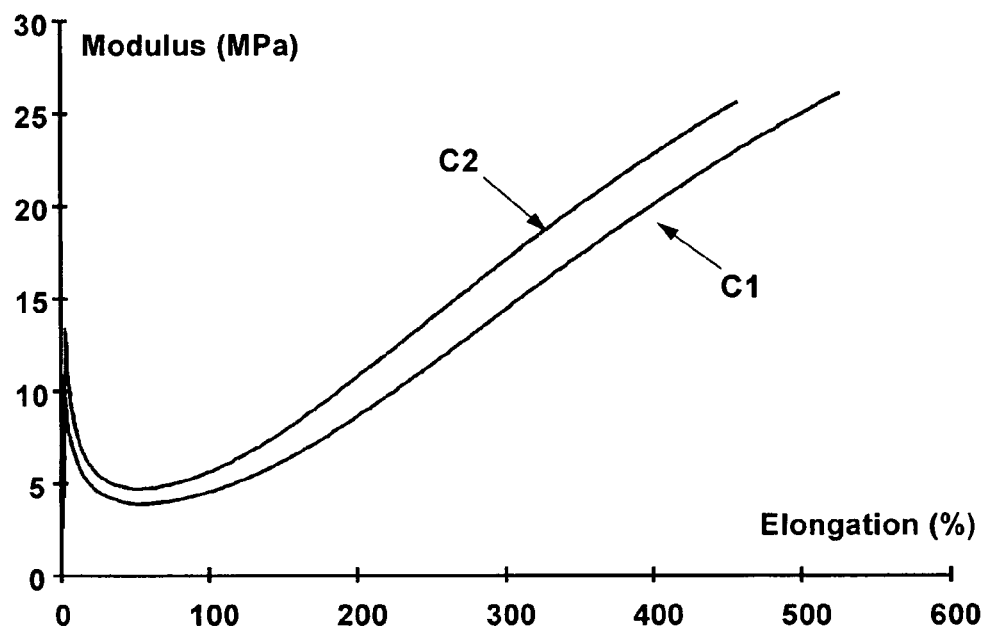

TIRE RUBBER COMPOSITION COMPRISING A COUPLING AGENT HAVING A POLYTHIOSULFENAMIDE FUNCTION

This application is a continuation of International PCT/EP02/14522 filed on Dec. 19, 2002 and which claims priority under 35 U.S.C. § 119 of Patent Application Serial No. 01/16853 filed in France on Dec. 20, 2001, the entire content of which is hereby incorporated by reference.

BACKGROUND OF THE INVENTION

The present invention relates to compositions of diene elastomers reinforced with a white or inorganic filler, intended particularly for the manufacture of tires or of semi-finished products for tires, in particular of treads for these tires.

It relates more particularly to the use, in such compositions, of bonding agents for coupling reinforcing inorganic fillers and diene elastomers.

It is generally known that in order to obtain the optimum reinforcement properties imparted by a filler, the latter should be present in the elastomeric matrix in a final form which is both as finely divided as possible and distributed as homogeneously as possible. Now, such conditions may only be obtained insofar as the filler has a very good ability firstly to be incorporated into the matrix during mixing with the elastomer and to disagglomerate, and secondly to be dispersed homogeneously in this matrix.

It is well known that carbon black has such abilities, which is generally not true of inorganic fillers, because, for reasons of mutual attraction, the inorganic filler particles have an irritating tendency to agglomerate together within the elastomeric matrix. These interactions have the harmful consequence of limiting the dispersion of the filler and hence the reinforcing properties to a substantially lower level than that which it would be theoretically possible to achieve if all the (inorganic filler/elastomer) bonds that could be created during the mixing operation were in fact obtained. These interactions furthermore tend to increase the viscosity of the rubber compositions and therefore to make them more difficult to work ("processability") in the uncured state than in the presence of carbon black.

Since fuel economies and the need to protect the environment have become priorities, it has however proved necessary to produce tires having reduced rolling resistance, without adversely affecting their wear resistance. This has been made possible in particular due to the discovery of new rubber compositions reinforced with specific inorganic fillers referred to as "reinforcing" fillers, which are capable of rivaling a conventional tire-grade carbon black from the reinforcing point of view, while offering these compositions a lower hysteresis, which is synonymous with lesser rolling resistance for the tires comprising them, and also very good grip properties on wet, snow-covered or icy ground.

Such rubber compositions, comprising reinforcing inorganic fillers for example of the silica or alumina type, have for example been described in the patents or patent applications EP 501 227 or U.S. Pat. No. 5,227,425, EP 735 088 or U.S. Pat. No. 5,852,099, EP 810 258 or U.S. Pat. No. 5,900,449, EP 881 252, WO99/02590, WO99/06480, WO00/05300 and WO00/05301.

Mention will be made in particular of documents EP 501 227, EP 735 088 or EP 881 252, which disclose diene rubber compositions reinforced with precipitated silicas of high dispersibility, such compositions making it possible to manufacture treads having a significantly improved rolling resistance, without adversely affecting the other properties, in particular those of grip, endurance and wear resistance. Such compositions having such a compromise of contradictory properties are also described in application EP 810 258, with specific aluminas of high dispersibility as reinforcing inorganic fillers.

Although the use of these specific, highly dispersible inorganic fillers has reduced the difficulties of processing in the uncured state the rubber compositions that contain them, they are still more difficult to process than for compositions filled conventionally with carbon black.

In particular, it is necessary to use a coupling agent, also referred to as bonding agent, the function of which is to provide the bond between the surface of the particles of inorganic filler and the elastomer, while facilitating the dispersion of this inorganic filler within the elastomeric matrix.

The term (inorganic filler/elastomer) "coupling agent" is understood in known manner to mean a compound capable of establishing a sufficient chemical and/or physical connection between the inorganic filler and the diene elastomer; such a coupling agent, which is at least bifunctional, has, for example, the simplified general formula "Y—T—X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the diene elastomer, for example by means of a sulfur atom;

T represents a divalent organic group making it possible to link Y and X.

The coupling agents must particularly not be confused with simple agents for covering the inorganic filler which, in known manner, may comprise the Y function which is active with respect to the inorganic filler but are devoid of the X function which is active with respect to the diene elastomer.

Coupling agents, in particular (silica/diene elastomer) coupling agents, have been described in a large number of documents, the best known being bifunctional organosilanes bearing three organoxysilyl (in particular alkoxysilyl) functions as Y function and, as X function, at least one function capable of reacting with the diene elastomer, such as, in particular, a sulfurised functional group (i.e. comprising sulfur).

Thus, it was proposed in patent applications FR 2 094 859 or GB 1 310 379 to use a mercaptoalkoxysilane coupling agent for manufacturing treads for tires. It was quickly shown, and is today well known, that mercaptoalkoxysilanes are capable of giving excellent silica/elastomer coupling properties, but that these coupling agents cannot be used industrially because of the very high reactivity of the thiol-type sulfur functions —SH ("X" functions), which very rapidly results, during the preparation of the rubber compositions, in an internal mixer, in premature vulcanization, this also being known as "scorching", in very high viscosities in the uncured state, and, finally, in rubber compositions which are virtually impossible to work and process industrially. To illustrate this problem, mention may be made for example of documents FR 2 206 330, U.S. Pat. No. 3,873,489 and U.S. Pat. No. 4,002,594.

To overcome this drawback, it has been proposed to replace these mercaptoalkoxysilanes by polysulfirised alkoxysilanes, in particular bis-(alkoxysilylpropyl) polysulfides such as described in many documents (see for example FR 2 149 339, FR 2 206 330, U.S. Pat. No. 3,842,111, U.S. Pat. No. 3,873, 489 or U.S. Pat. No. 3,997,581). Among these polysulfides, mention must be made in particular of bis-3-triethoxysilyl-propyl tetrasulfide (abbreviated to TESPT) or bis 3-triethoxysilylpropyl disulfide (abbreviated to TESPD).

These polysulfurised alkoxysilanes, in particular TESPT, are generally considered as the products providing, for vulcanized rubber compositions comprising a reinforcing inorganic filler, in particular silica, the best compromise in terms of resistance to scorching, processability and reinforcing ability. As such, they are the coupling agents which are most used nowadays in tire rubber compositions.

Now, unexpectedly, during the course of its research, the Applicant discovered that specific coupling agents may offer a compromise of performances which is improved still further compared with the use of polysulfurised alkoxysilanes, in particular TESPT, in rubber compositions for tires.

These coupling agents are organosilicon compounds which have the essential characteristic of bearing, as X function, a specific polythiosulfenamide functional group. They do not have the aforementioned scorching problems found in particular with mercaptosilanes, while offering the rubber compositions high reinforcement properties combined on one hand with excellent processability in the uncured state and very good ability to be vulcanized.

Consequently, a first subject of the invention relates to an elastomeric composition usable for the manufacture of tires, comprising at least, as base constituents, (i) a diene elastomer, (ii) an inorganic filler as reinforcing filler and (iii), as (inorganic filler/diene elastomer) coupling agent, an organosilicon compound which is at least bifunctional and can be grafted on to the elastomer by means of a sulfur group having a polythiosulfenamide function, of formula:

$$\equiv Si\text{---}A\text{---}S_x\text{---}NR^1R^2, \qquad (I)$$

in which:

A is a divalent bond group, whether straight-chain or branched, which makes it possible to join the polythiosulfenamide group to a silicon atom of the organosilicon compound;

x is an integer or fractional number of from 2 to 4;

$R^1$ represents hydrogen or a monovalent hydrocarbon group;

$R^2$ represents a monovalent hydrocarbon group selected from among $C_3$-$C_8$ alkyls, whether straight-chain or branched, $C_5$-$C_{10}$ cycloalkyls, $C_6$-$C_{18}$ aryls and ($C_6$-$C_{18}$)aryl-($C_1$-$C_8$)alkyls;

$R^1$ and $R^2$ possibly forming together and with the nitrogen atom to which they are bonded a single hydrocarbon ring.

Another subject of the invention is the use of a rubber composition according to the invention for the manufacture of tires or for the manufacture of semi-finished products intended for such tires, these semi-finished products being selected in particular from among the group comprising treads, underlayers intended for example to be positioned beneath these treads, crown reinforcement plies, sidewalls, carcass reinforcement plies, beads, protectors, inner tubes and airtight internal rubbers for tubeless tires.

A further subject of the invention is these tires and these semi-finished products themselves, when they comprise an elastomeric composition according to the invention, these tires being intended to be fitted on passenger vehicles, 4×4 vehicles (having 4 driving wheels), SUVs ("Sport Utility Vehicles"), two-wheeled vehicles (in particular bicycles or motorcycles), and also industrial vehicles selected from among vans, "heavy vehicles"—i.e. subway trains, buses, road transport machinery (lorries, tractors, trailers), off-road vehicles—, agricultural machinery or construction machinery, aircraft and other transport or handling vehicles.

SUMMARY OF THE INVENTION

The invention relates in particular to treads for tires, these treads being able to be used in the manufacture of new tires or for recapping worn tires; owing to the compositions of the invention, these treads have all of the following: low rolling resistance, very good grip and high wear resistance.

The invention also relates to a process for the preparation of a rubber composition usable for the manufacture of tires, such a process comprising the following steps:
  incorporating in a diene elastomer, in a mixer, at least:
    a reinforcing inorganic filler;
    as (inorganic filler/diene elastomer) coupling agent, an organosilicon compound which is at least bifunctional and can be grafted onto the elastomer by means of a sulfur group,
  thermomechanically kneading the entire mixture, in one or more stages, until a maximum temperature of between 110° C. and 190° C. is reached;
  cooling the entire mixture to a temperature of less than 100° C.;
  then incorporating a cross-linking system;
  kneading the entire mixture until a maximum temperature of less than 120° C. is reached, and being characterized in that said sulfur group satisfies the aforementioned formula (I).

A further subject of the invention is the use as (inorganic filler/diene elastomer) coupling agent, in a composition based on diene elastomer reinforced by an inorganic filler intended for the manufacture of tires, of an organosilicon compound, which is at least bifunctional and can be grafted on to the elastomer by means of a sulfur group, having a polythiosulfenamide function, of the aforementioned formula (I).

Finally, a subject of the invention is a process for coupling an inorganic filler and a diene elastomer, in an elastomeric composition usable for the manufacture of tires, such process comprising the following steps:
  incorporating in a diene elastomer, in a mixer, at least:
    a reinforcing inorganic filler;
    as (inorganic filler/diene elastomer) coupling agent, an organosilicon compound which is at least bifunctional and can be grafted onto the elastomer by means of a sulfur group,
  thermomechanically kneading the entire mixture, in one or more stages, until a maximum temperature of between 110° C. and 190° C. is reached;
  cooling the entire mixture to a temperature of less than 100° C., and being characterized in that said sulfur group satisfies the aforementioned formula (I).

The invention and its advantages will be readily understood in the light of the description and examples of embodiment which follow, and of the single FIGURE relating to these examples.

BRIEF DESCRIPTION OF THE DRAWING

The single FIGURE shows curves of the variation of modulus as a function of elongation for various diene rubber compositions, whether or not in accordance with the invention.

DETAILED DESCRIPTION OF THE INVENTION

I. Measurements and Tests Used

The rubber compositions are characterized before and after curing, as indicated below.

I-1. Mooney Plasticity

An oscillating consistometer such as described in French Standard NF T 43-005 (1991) is used. The Mooney plasticity is measured in accordance with the following principle: the composition in the uncured state (i.e. before curing) is moulded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 Newton.meter).

I-2. Scorching Time

The measurements are effected at 130° C., in accordance with French Standard NF T 43-005 (1991). The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

I-3. Tensile Tests

These tests make it possible to determine the elasticity stresses and the properties at break. Unless indicated otherwise, they are effected in accordance with French Standard NF T 46-002 of September 1988. The nominal secant moduli (or apparent stresses, in MPa) at 10% elongation (ME10), 100% elongation (ME100) and 300% elongation (ME300) are measured in a second elongation (i.e. after an accommodation cycle). The breaking stresses (in MPa) and the elongations at break (in %) are also measured. All these tensile measurements are effected under normal conditions of temperature (23±2° C.) and humidity (50±5% relative humidity), in accordance with French Standard NF T 40-101 (December 1979).

Processing the tensile data recorded also makes it possible to trace the curve of the modulus as a function of the elongation (see attached FIGURE), the modulus used here being the true secant modulus measured in a first elongation, calculated reduced to the real cross-section of the test sample and not to the initial section as previously for the nominal moduli.

I-4. Rheometric Properties

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanization reaction. The measurements are processed in accordance with DIN Standard 53529—part 2 (March 1983): $T_i$ is the induction delay, that is to say, the time necessary for the start of the vulcanization reaction; $T_\alpha$ (for example $t_{99}$) is the time necessary to achieve a conversion of $\alpha$%, that is to say $\alpha$% (for example 99%) of the deviation between the minimum ($C_{min}$) and maximum ($C_{max}$) torques. There are also measured the deviation ($\Delta$torque expressed in dN.m) between $C_{max}$ and $C_{min}$, which makes it possible to assess the vulcanization yield, and also the conversion rate constant K (expressed in $min^{-1}$), of order 1, calculated between 30% and 80% conversion, which for its part makes it possible to assess the vulcanization kinetics (the higher K is, the faster the kinetics).

II. Conditions of Implementation of the Invention

The rubber compositions according to the invention are based on at least each of the following constituents: (i) a (at least one) diene elastomer, (ii) a (at least one) inorganic filler as reinforcing filler, and (iii) a (at least one) specific organosilicon compound as (inorganic filler/diene elastomer) coupling agent.

Of course, the expression composition "based on" is to be understood to mean a composition comprising the mix and/or the product of reaction in situ of the various constituents used, some of these base constituents being liable to, or intended to, react together, at least in part, during the different phases of manufacture of the composition, in particular during the vulcanization thereof.

II-1. Diene Elastomer

"Diene" elastomer or rubber is understood to mean, in known manner, an elastomer resulting at least in part (i.e. a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a) any homopolymer obtained by polymerisation of a conjugated diene monomer having 4 to 12 carbon atoms;
(b) any copolymer obtained by copolymerisation of one or more dienes conjugated together or with one or more vinyl-aromatic compounds having 8 to 20 carbon atoms;
(c) a ternary copolymer obtained by copolymerisation of ethylene, of an $\alpha$-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
(d) a copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerisation conditions used, in particular of the presence or absence of a modifying and/or randomising agent and the quantities of modifying and/or randomising agent used. The elastomers may for example be block, statistical, sequential or microsequential elastomers, and may be prepared in dispersion or in solution; they may be coupled and/or starred or alternatively functionalised with a coupling and/or starring or functionalising agent.

Preferred are polybutadienes, and in particular those having a content of 1,2-units of between 4% and 80%, or those having a content of cis-1,4 of more than 80%, polyisoprenes, butadiene/styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene/isoprene copolymers and in particular those having an isoprene content of between 5% and 90% by weight and a glass transition temperature (Tg, measured in accordance with ASTM Standard D3418-82) of from −40° C. to −80° C., isoprene/styrene copolymers and in particular those having a styrene content of between 5% and 50% by weight and a Tg of between −25° C. and −50° C. In the case of butadiene/styrene/isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2- plus 3,4-units of the isoprene fraction of between 5% and 70%, and a content of trans-1,4 units of the isoprene fraction of between 10% and 50%, and more generally any butadiene/styrene/isoprene copolymer having a Tg of between −20° C. and −70° C.

In summary, particularly preferably, the diene elastomer of the composition according to the invention is selected from the group of highly unsaturated diene elastomers which consists of polybutadienes (BR), polyisoprenes (IR), natural rubber (NR), butadiene copolymers, isoprene copolymers and mixtures of these elastomers. Such copolymers are more preferably selected from the group which consists of butadiene/styrene copolymers (SBR), isoprene/butadiene copolymers (BIR), isoprene/styrene copolymers (SIR) and isoprene/butadiene/styrene copolymers (SBIR).

The composition according to the invention is particularly intended for a tread for a tire, be it a new or a used tire (case of retreading).

In the case of a passenger-car tire, the diene elastomer is for example an SBR, be it an SBR prepared in emulsion ("ESBR") or an SBR prepared in solution ("SSBR"), or an SBR/BR, SBR/NR (or SBR/IR), or alternatively BR/NR (or BR/IR), blend (mixture). In the case of an SBR elastomer, in particular an SBR having a styrene content of between 20% and 30% by weight, a content of vinyl bonds of the butadiene fraction of between 15% and 65%, a content of trans-1,4 bonds of between 15% and 75%, and a Tg of between −20° C. and −55° C. is used. Such an SBR copolymer, preferably prepared in solution (SSBR), is possibly used in a mixture with a polybutadiene (BR) having preferably more than 90% cis-1,4 bonds.

In the case of a tire for a utility vehicle, in particular for a heavy vehicle, the diene elastomer is in particular an isoprene elastomer; "isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isobutene/isoprene copolymers (butyl rubber—IIR), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used. For such a tire for a utility vehicle, the diene elastomer may also be constituted, in its entirety or in part, of another highly unsaturated elastomer such as, for example, an SBR elastomer.

According to another advantageous embodiment of the invention, in particular when it is intended for a tire sidewall, the composition according to the invention may contain at least one essentially saturated diene elastomer, in particular at least one EPDM copolymer, whether this copolymer be used or not used, for example, in a mixture with one or more of the highly unsaturated diene elastomers mentioned above.

The compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

II-2. Reinforcing Filler

The white or inorganic filler used as reinforcing filler may constitute all or only part of the total reinforcing filler, in this latter case associated, for example, with carbon black.

Preferably, in the rubber compositions according to the invention, the reinforcing inorganic filler constitutes the majority, i.e. more than 50% by weight, of the total reinforcing filler, more preferably more than 80% by weight of this total reinforcing filler.

In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words being capable of replacing a conventional tire-grade carbon black filler in its reinforcement function.

Preferably, the reinforcing inorganic filler is a mineral filler of the type silica ($SiO_2$) or alumina ($Al_2O_3$), or a mixture of these two fillers.

The silica used may be any reinforcing silica known to the person skilled in the art, in particular any precipitated or fumed silica having a BET surface area and a specific CTAB surface area both of which are less than 450 m²/g, preferably from 30 to 400 m²/g. Highly dispersible precipitated silicas (referred to as "HDS") are preferred, in particular when the invention is used for the manufacture of tires having a low rolling resistance; "highly dispersible silica" is understood in known manner to mean any silica having a substantial ability to disagglomerate and to disperse in an elastomeric matrix, which can be observed in known manner by electron or optical microscopy on thin sections. As non-limitative examples of such preferred highly dispersible silicas, mention may be made of the silica Perkasil KS 430 from Akzo, the silica BV3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped" silicas described in application EP-A-0 735 088.

The reinforcing alumina preferably used is a highly dispersible alumina having a BET surface area from 30 to 400 m²/g, more preferably between 60 and 250 m²/g, and an average particle size at most equal to 500 nm, more preferably at most equal to 200 nm, as described in the aforementioned application EP-A-0 810 258. Non-limitative examples of such reinforcing aluminas are in particular the aluminas "Baikalox", "A125", "CR125" and "D65CR" from Baïkowski.

The physical state in which the reinforcing inorganic filler is present is immaterial, whether it be in the form of a powder, microbeads, granules, pellets, balls or any other densified form. Of course, "reinforcing inorganic filler" is also understood to mean mixtures of different reinforcing inorganic fillers, in particular of highly dispersible silicas and/or aluminas such as described above.

When the rubber compositions of the invention are used as treads for tires, the reinforcing inorganic filler used, in particular if it is silica, preferably has a BET surface area of between 60 and 250 m²/g, more preferably between 80 and 200 m²/g.

The reinforcing inorganic filler may also be used in a blend (mixture) with carbon black. Suitable carbon blacks are any carbon blacks, in particular the blacks of type HAF, ISAF and SAF, which are conventionally used in tires, and particularly in tire treads. As non-limitative examples of such blacks, mention may be made of the blacks N115, N134, N234, N339, N347 and N375.

The amount of carbon black present in the total reinforcing filler may vary within wide limits, this amount of carbon black preferably being less than the amount of reinforcing inorganic filler present in the rubber composition.

In the compositions according to the invention, in particular in the treads incorporating such compositions, it is preferred to use, in a small proportion, a carbon black in association with the reinforcing inorganic filler, in a preferred amount of between 2 and 20 phr, more preferably within a range from 5 to 15 phr. Within the ranges indicated, there is a benefit to be had from the colouring properties (black pigmentation agent) and anti-UV properties of the carbon blacks, without furthermore adversely affecting the typical performance provided by the reinforcing inorganic filler, namely low hysteresis (reduced rolling resistance) and high adhesion on wet, snow-covered or icy ground.

Preferably, the amount of total reinforcing filler (reinforcing inorganic filler plus carbon black if applicable) is between 10 and 200 phr, more preferably between 20 and 150 phr, the optimum differing according to the intended applications, because the level of reinforcement expected of a bicycle tire, for example, is in known manner distinctly lower than that required for a tire liable to travel at a sustained high speed, for example a motorcycle tire, a passenger-vehicle tire or a tire for a utility vehicle such as a heavy vehicle.

For treads for such tires which are capable of travelling at high speed, the quantity of reinforcing inorganic filler, in particular in the case of silica, is preferably between 30 and 140 phr, more preferably within a range from 50 to 120 phr.

In the present specification, the BET specific surface area is determined by adsorption of gas using the method of Brunauer-Emmett-Teller described in "*The Journal of the American Chemical Society*" Vol. 60, page 309, February 1938, more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17]. The CTAB specific surface area is the external surface area determined in accordance with French Standard NF T 45-007 of November 1987 (method B).

Finally, the person skilled in the art will understand that, as filler equivalent to the reinforcing inorganic filler described in the present section, there could be used a reinforcing organic filler, in particular a carbon black, covered at least in part with an inorganic layer, for example silica, which for its part requires the use of a coupling agent to provide the bond to the elastomer.

II-3. Coupling Agent (Organosilicon Compound)

As explained previously, an (inorganic filler/diene elastomer) coupling agent, in known manner, bears at least two functions, referred to here as "Y" and "X", which enable it to be grafted, on one hand to the reinforcing inorganic filler by means of the Y function, for example a hydroxyl group or a hydrolysable group, and on the other hand to the diene elastomer by means of the X function, for example a sulfur function.

One essential characteristic of the organosilicon compound used as coupling agent in the compositions according to the invention is that this compound can be grafted onto the elastomer by means of a sulfur group having a polythiosulfenamide function, of formula:

$$\equiv Si-A-S_x-NR^1R^2, \quad (I)$$

in which:
A is a divalent bond group, whether straight-chain or branched, which makes it possible to join the polythiosulfenamide group to a silicon atom of the organosilicon compound;
x is an integer or fractional number of from 2 to 4;
$R^1$ represents hydrogen or a monovalent hydrocarbon group;
$R^2$ represents a monovalent hydrocarbon group selected from among the group consisting of $C_3$-$C_8$ alkyls, whether straight-chain or branched, $C_5$-$C_{10}$ cycloalkyls, $C_6$-$C_{18}$ aryls and $(C_6$-$C_{18})$aryl-$(C_1$-$C_8)$alkyls;
$R^1$ and $R^2$ possibly forming together and with the nitrogen atom to which they are bonded a single hydrocarbon ring.

It will be recalled here that "organosilicon" (or "organosilicic") compound is to be understood to mean, by definition, an organic compound comprising at least one carbon-silicon bond.

The divalent group A is preferably selected from among aliphatic hydrocarbon groups, whether saturated or unsaturated, carbocyclic groups, whether saturated, unsaturated or/and aromatic, monocyclic or polycyclic, and groups having an aliphatic hydrocarbon portion, whether saturated or unsaturated and a carbocyclic portion such as defined above.

This group A preferably comprises from 1 to 18 carbon atoms, and represents more preferably an alkylene chain, a saturated cycloalkylene group, an arylene group or a divalent group consisting of a combination of at least two of these groups. It is more preferably selected from among $C_1$-$C_{18}$ alkylenes and $C_6$-$C_{12}$ arylenes; it may be substituted or interrupted by one or more heteroatoms, selected in particular from among S, O and N.

According to a particularly preferred embodiment of the invention, the group A represents a $C_1$-$C_8$ alkylene, more preferably still a $C_1$-$C_4$ alkylene chain, in particular methylene, ethylene or propylene, more preferably still propylene.

In formula (I) above, in the case in which the synthesis path of the compound in question can give rise to only a single type of polysulfurised group, the number x is then an integer which is equal to 2, 3 or 4, preferably equal to 2 or 3.

However, the person skilled in the art will readily understand that this number may be an average fractional number when the synthesis path gives rise to a mixture of polysulfurised groups each having a different number of sulfur atoms; in such a case, the polythiosulfenamide group which is synthesised is in fact formed of a distribution of polysulfides, from the disulfide $S_2$ to heavier polysulfides, centred on an average value (in mole) of the "x"s (fractional number) of between 2 and 4, more preferably of between 2 and 3.

The monovalent hydrocarbon group represented by $R^1$ may be aliphatic, straight-chain or branched, or carbocyclic, in particular aromatic; it may be substituted or non-substituted, saturated or unsaturated.

In the case of an aliphatic hydrocarbon group, this comprises in particular from 1 to 25 carbon atoms, more preferably from 1 to 12 carbon atoms.

By way of example of a saturated aliphatic hydrocarbon group, mention may be made of alkyl groups such as methyl, ethyl, propyl, isopropyl, butyl, isobutyl, tert. butyl, pentyl, isopentyl, neopentyl, 2-methylbutyl, 1-ethylpropyl, hexyl, isohexyl, neohexyl, 1-methylpentyl, 3-methylpentyl, 1,1-dimethylbutyl, 1,3-dimethylbutyl, 2-ethylbutyl, 1-methyl-1-ethylpropyl, heptyl, 1-methylhexyl, 1-propylbutyl, 4,4-dimethylpentyl, octyl, 1-methylheptyl, 2-ethylhexyl, 5,5-dimethylhexyl, nonyl, decyl, 1-methylnonyl, 3,7-dimethyloctyl and 7,7-dimethyloctyl.

The unsaturated aliphatic hydrocarbon groups which are usable comprise one or more unsaturated sites, preferably one, two or three unsaturated sites of ethylenic type (double bond) or/and acetylenic type (triple bond). Examples are the alkenyl or alkynyl groups deriving from the alkyl groups defined above by elimination of two hydrogen atoms, or more. Preferably, the unsaturated aliphatic hydrocarbon groups comprise a single unsaturated site.

"Carbocyclic radical" is understood to mean a monocyclic or polycyclic radical, possibly substituted, preferably a $C_3$-$C_{50}$ radical. Advantageously, it is a $C_3$-$C_{18}$ radical which is preferably mono-, bi- or tricyclic. When the carbocyclic radical comprises more than one cyclic core (as is the case with polycyclic carbocycles), the cyclic cores are condensed two by two. Two condensed cores may be ortho-condensed or peri-condensed. The carbocyclic radical may, unless indicated otherwise, comprise a saturated portion and/or an aromatic portion and/or an unsaturated portion.

Examples of saturated carbocyclic radicals are cycloalkyl groups. Preferably, the cycloalkyl groups are $C_3$-$C_{18}$, better still $C_5$-$C_{10}$, groups. Mention may be made in particular of the radicals cyclopentyl, cyclohexyl, cycloheptyl, cyclooctyl, adamantyl or norbornyl.

The unsaturated carbocycle or any unsaturated portion of carbocyclic type has one or more ethylenically unsaturated sites, preferably one, two or three. It advantageously comprises from 6 to 50 carbon atoms, better still from 6 to 20, for example from 6 to 18 carbon atoms.

Examples of unsaturated carbocycles are $C_6$-$C_{10}$ cycloalkenyl groups. Examples of aromatic carbocyclic radicals are $C_6$-$C_{18}$ aryl groups and in particular phenyl, naphthyl, anthryl and phenanthryl.

A group having both an aliphatic hydrocarbon portion and a carbocyclic portion as defined above is, for example, an arylalkyl group such as benzyl, or an alkylaryl group such as tolyl.

The substituents of the aliphatic hydrocarbon groups or portions and of the carbocyclic groups or portions are, for example, alkoxyl groups in which the alkyl portion is preferably such as defined above.

$R^1$ preferably comprises from 1 to 25 carbon atoms. According to one particularly preferred embodiment, $R^1$ is selected from the group consisting of hydrogen, $C_1$-$C_8$ alkyls, whether straight-chain or branched, $C_5$-$C_{10}$ cycloalkyls, $C_6$-$C_{18}$ aryls and ($C_6$-$C_{18}$)aryl-($C_1$-$C_8$)alkyls.

More preferably still, $R^1$ is selected from the group consisting of hydrogen, methyl, ethyl, propyl, isopropyl, butyl, isobutyl, tert. butyl, pentyl, hexyl, cyclohexyl, benzyl and phenyl, in particular from among hydrogen, methyl, ethyl, propyl, isopropyl, cyclohexyl and benzyl.

The radical $R^2$ is preferably selected from among $C_3$-$C_6$ alkyls, whether straight-chain or branched, (in particular propyl, isopropyl, butyl, isobutyl, tert. butyl, pentyl or hexyl), $C_5$-$C_8$ cycloalkyls (in particular cyclopentyl or cyclohexyl), $C_6$-$C_{12}$ aryls (in particular phenyl) and ($C_6$-$C_{12}$)aryl-($C_1$-$C_6$) alkyls (in particular benzyl). More preferably still, $R^2$ is selected from among propyl, isopropyl, cyclohexyl and benzyl.

$R^1$ and $R^2$ may furthermore form, together and with the nitrogen atom to which they are bonded, a single hydrocarbon ring, such a hydrocarbon ring preferably having from 5 to 7 chain links and comprising in the ring 3 to 6 carbon atoms, at least one nitrogen atom and possibly one or two unsaturated double bond(s).

Mention will be made, as single rings which can be formed jointly by the substituents $R^1$ and $R^2$ of the nitrogen atom present in formula (I), for example of the following rings in which the free valency borne by a nitrogen atom is linked to the group $S_x$: pyrrole, imidazole, pyrazole, pyrrolidine, Δ2-pyrroline, imidazolidine, Δ2-imidazoline, pyrazolidine, Δ3-pyrazoline, piperidine; preferred examples are: pyrrole, imidazole and pyrazole.

The person skilled in the art will be able to adapt the nature of the Y function to the specific organosilicon compound in question on which is grafted, by means of bond group A, the polythiosulfenamide group, this function Y possibly being different, for example a hydroxyl or hydrolysable group, according to the type of organosilicon compound in question, in particular a polyfunctional silane or polysiloxane.

The person skilled in the art will understand that the expression "polyfunctional silane" is to be understood to mean a silane bearing on one hand a Y function consisting of one, two or three hydroxyl group(s) or hydrolysable monovalent group(s) linked to a silicon atom, and on the other hand an X function consisting of a polythiosulfenamide group of formula (I) which is linked to the silicon atom of the Y function by the divalent bond group A. The person skilled in the art will also understand that the expression "polyfunctional polysiloxane" is to be understood to mean a polysiloxane bearing, in the chain and/or at the chain end(s), as Y function, at least one siloxyl unit equipped with one, two or three OH group(s) or hydrolysable monovalent group(s), and, as X function, at least one siloxyl unit equipped with a polythiosulfenamide group of formula (I).

Without this embodiment being limitative, the organosilicon compound of formula (I) is preferably a silane compound bearing, as Y function, one or more (maximum of 3) (OR) groups fixed to a silicon atom, R representing hydrogen or a monovalent hydrocarbon group, whether straight-chain or branched (in particular alkyl).

Thus, there may be used as organosilicon compound particularly suitable for the invention a polythiosulfenamide silane of the general formula:

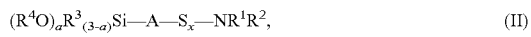

in which:
R$^3$ represents a monovalent hydrocarbon group;
R$^4$ represents hydrogen or a monovalent hydrocarbon group, which may be identical to or different from R$^3$;
a is an integer equal to 1, 2 or 3;
R$^1$ and R$^2$ have the definitions given above.

The person skilled in the art will readily understand that a bifunctional organosilicon compound of this type of formula (II) comprises a (first) "Y" function [symbolised by the 1 to 3 (OR$^4$)$_a$ group(s) fixed to the silicon atom] linked, by means of the bond group A, to the polythiosulfenamide functional group of formula (I) [(second) "X" function symbolised by —S$_x$—NR$^1$R$^2$].

The radicals R$^3$ and R$^4$, which may be identical or different, are hydrocarbon groups selected in particular from among aliphatic hydrocarbon groups, whether saturated or unsaturated, carbocyclic groups, whether saturated, unsaturated or/and aromatic, monocyclic or polycyclic, and groups having an aliphatic hydrocarbon portion, whether saturated or unsaturated, and a carbocyclic portion such as defined above, preferably comprising from 1 to 18 carbon atoms, these different groups possibly being substituted or not substituted.

The radicals R$^3$, which may be identical or different if they are several in number, preferably represent an alkyl, a cycloalkyl or an aryl. They are more preferably selected from among the group consisting of C$_1$-C$_8$ alkyls, C$_5$-C$_{10}$ cycloalkyls (in particular cyclohexyl) and phenyl. More preferably still, R$^3$ is selected from the group consisting of C$_1$-C$_6$ alkyls (in particular methyl, ethyl, propyl and isopropyl).

The radicals R$^4$, which may be identical or different if they are several in number, preferably represent an alkyl, a cycloalkyl, an acyl or an aryl. They are more preferably selected from among the group consisting of C$_1$-C$_8$ alkyls, possibly halogenated and/or possibly substituted by one or more (C$_2$-C$_8$) alkoxys; C$_2$-C$_8$ acyls, possibly halogenated and/or possibly substituted by one or more (C$_2$-C$_8$) alkoxys; C$_5$-C$_{10}$ cycloalkyls and C$_6$-C$_{18}$ aryls. More preferably still, R$^4$ is selected from the group consisting of C$_1$-C$_8$ alkyls (in particular methyl, ethyl, n-propyl, isopropyl, n-butyl, β-chloropropyl, β-chloroethyl), possibly substituted by one or more (C$_2$-C$_8$) alkoxys (in particular methoxy, ethoxy, propoxy, isopropoxy); C$_5$-C$_{10}$ cycloalkyls and phenyl.

According to the best embodiment known, R$^3$ and R$^4$, which may be identical or different, are both selected (if a≠3) from among C$_1$-C$_4$ alkyls, in particular from among methyl and ethyl.

As more preferred organosilicon compounds usable in the compositions of the invention, mention will be made in particular of polythiosulfenamide silanes of formula (II) in which the group A represents a C$_1$-C$_4$ alkylene, in particular methylene, ethylene or propylene (more preferably still propylene), the radicals R$^3$ and R$^4$, which may be identical or different, representing more preferably a C$_1$-C$_3$ alkyl, in particular methyl or ethyl, and more particularly, from among these compounds, dithiosulfenamide silanes for which x is equal to 2.

Of these more preferred compounds of formula (II), mention will be made more particularly of polythiosulfenamide alkoxysilanes in which R$^1$ is selected from the more preferred group consisting of hydrogen, methyl, ethyl, propyl, isopropyl, cyclohexyl and benzyl, R$^2$ being for its part selected from the more preferred group consisting of propyl, isopropyl, cyclohexyl and benzyl, such as, for example:

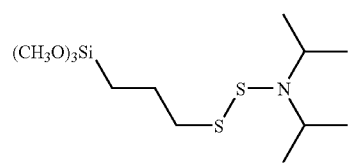

di(isopropyl)trimethoxysilylpropyldithio-sulfenamide of formula (III-1):
di(isopropyl)triethoxysilylpropyldithio-sulfenamide of formula (III-2):

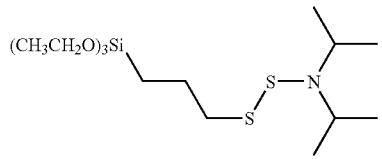

di(isopropyl)ethoxydimethylsilylpropyldithio-sulfenamide of formula (III-3):

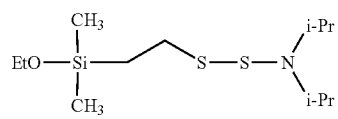

(N-benzylamine)triethoxysilylpropyldithio-sulfenamide of formula (IV):

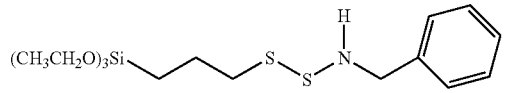

(N-cyclohexylamine)trimethoxysilylpropyldithio-sulfenamide of formula (V):

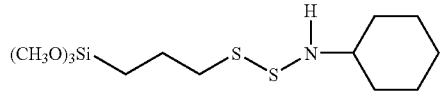

(N-methyl-N-benzylamine)trimethoxysilylpropyldithio-sulfenamide of formula (VI):

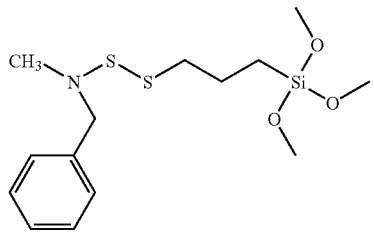

(N-methyl-N-cyclohexylamine)triethoxysilylpropyldithio-sulfenamide of formula (VII):

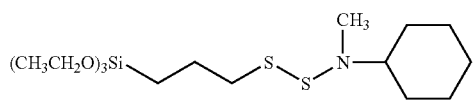

As other preferred compounds of formula (II), mention may be made of:
di(isopropyl)methoxydimethylsilylpropyldithio-sulfenamide;
di(isopropyl)dimethoxymethylsilylpropyldithio-sulfenamide;
di(isopropyl)ethoxydimethylsilylpropyldithio-sulfenamide;
di(isopropyl)diethoxymethylsilylpropyldithio-sulfenamide;
(N-cyclohexylamine)methoxydimethylsilylpropyldithio-sulfenamide;
(N-cyclohexylamine)dimethoxymethylsilylpropyldithio-sulfenamide;
(N-cyclohexylamine)ethoxydimethylsilylpropyldithio-sulfenamide;
(N-cyclohexylamine)diethoxymethylsilylpropyldithio-sulfenamide;
(N-methyl-N-cyclohexylamine)methoxydimethylsilylpropyldithio-sulfenamide;
(N-methyl-N-cyclohexylamine)dimethoxymethylsilylpropyldithio-sulfenamide;
(N-methyl-N-cyclohexylamine)ethoxydimethylsilylpropyldithio-sulfenamide;
(N-methyl-N-cyclohexylamine)diethoxymethylsilylpropyldithio-sulfenamide;
(N-benzylamine)ethoxydimethylsilylpropyldithio-sulfenamide;
(N-benzylamine)diethoxymethylsilylpropyldithio-sulfenamide;
(N-benzylamine)methoxydimethylsilylpropyldithio-sulfenamide;
(N-benzylamine)dimethoxymethylsilylpropyldithio-sulfenamide;
(N-methyl-N-benzylamine)ethoxydimethylsilylpropyldithio-sulfenamide;
(N-methyl-N-benzylamine)diethoxymethylsilylpropyldithio-sulfenamide;
(N-methyl-N-benzylamine)methoxydimethylsilylpropyldithio-sulfenamide;
(N-methyl-N-benzylamine)dimethoxymethylsilylpropyldithio-sulfenamide.

Of the compounds of general formula (II) above, the ones which are very particularly selected are those for which:
$R^1$ and $R^2$, which may be identical or different, are both selected from among propyl, isopropyl, cyclohexyl and benzyl, more preferably still from among propyl and isopropyl;
x is an integer or fractional number of from 2 to 4, more preferably still equal to 2;
A is selected from among methylene, ethylene or propylene, and more preferably still represents propylene;
$R^3$ and $R^4$, which may be identical or different, are both selected (if a≠3) from among $C_1$-$C_4$ alkyls, more preferably still from among methyl and ethyl;
a is an integer equal to 1, 2 or 3, such as in particular the dithiosulfenamide silanes of formulae (III-1), (III-2) and (III-3) above.

The polyfunctional coupling agents above, which bear a polythiosulfenamide group, exhibited very good reactivity with respect to the diene elastomers used in rubber compositions for tires, and have proved sufficiently effective on their own for coupling such elastomers and a reinforcing inorganic filler such as silica. Without this being limitative, they may advantageously constitute the sole coupling agent present in the rubber compositions of the invention.

So as to make allowance for the differences in specific surface area and density of the reinforcing inorganic fillers which may be used, as well as the molar masses of the coupling agents specifically used, it is preferable to determine the optimum amount of coupling agent, in moles per meter squared of reinforcing inorganic filler, for each reinforcing inorganic filler used; this optimum amount is calculated from the weight ratio [coupling agent/reinforcing inorganic filler], the BET surface area of the filler and the molar mass of the coupling agent (referred to as M hereafter), according to the following known equation:

$$(\text{moles/m}^2 \text{ inorganic filler}) = [\text{coupling agent/inorganic filler}](1/\text{BET})(1/M)$$

Thus, preferably, the quantity of coupling agent used in the compositions according to the invention lies between $10^{-7}$ and $10^{-5}$ moles per $m^2$ of reinforcing inorganic filler. More preferably still, the amount of coupling agent lies between $5 \times 10^{-7}$ and $5 \times 10^{-6}$ moles per meter squared of total inorganic filler.

Taking into account the quantities expressed above, generally, the content of coupling agent will preferably be greater than 1 phr, more preferably between 2 and 20 phr. Below the minimum amounts indicated, the effect risks being inadequate, whereas beyond the maximum amount advocated generally no further improvement in the coupling is observed, while the costs of the composition increase; for these various reasons, this content of coupling agent is more preferably still between 3 and 12 phr.

The person skilled in the art will be able to adjust this content of coupling agent according to the intended application, for example the part of the tire for which the composition of the invention is intended, the nature of the diene elastomer, the quantity of reinforcing inorganic filler used and the nature of the organosilicon compound in question.

Of course, in order to reduce the costs of the rubber compositions, it is desirable to use as little as possible thereof, that is to say what is just necessary for sufficient coupling between the diene elastomer and the reinforcing inorganic filler. Its effectiveness makes it possible, in a large number of cases, to use the coupling agent in a preferred amount representing between 0.5% and 20% by weight relative to the quantity of reinforcing inorganic filler; amounts less than 15%, in particular less than 10%, are more particularly preferred.

Finally, it will be noted that the organosilicon compound previously described could be grafted beforehand (via the "Y" function) onto the reinforcing inorganic filler, the thus "precoupled" filler then being able to be later bonded to the diene elastomer by means of the free "X" function.

II-4. Synthesis of the Coupling Agent (Organosilicon Compound)

By way of example, organosilicon compounds such as described previously may be prepared in accordance with the preferred synthesis paths indicated hereafter (methods referred to as A to E).

A) Method "A"

The organosilicon compounds of general formula (II) in which x=2 (organosilicon compounds having a dithiosulfenamide function) may be obtained in particular by reacting a disulfide halide of formula:

(VIII)

in which A, $R^3$, $R^4$ and a are as defined above and Hal represents a halogen (bromine, chlorine, fluorine or iodine, preferably chlorine), on the appropriate amine of formula:

$HNR^1R^2$ (IX)

in which $R^1$ and $R^2$ are as defined above, in the presence of a base, preferably an organic base.

Appropriate bases are, for example, N-methylmorpholine, triethylamine, tributylamine, diisopropylethylamine, dicyclohexylamine, N-methylpiperidine, pyridine, 4-(1-pyrrolidinyl)pyridine, picoline, 4-(N,N-dimethylamino)pyridine, 2,6-di-tert. butyl-4-methylpyridine, quinoline, N,N-dimethylaniline, N,N-diethylaniline, 1,8-diazabicyclo[5.4.0]undec-7-ene (DBU), 1,5-diazabicyclo[4.3.0]non-5-ene (DBN) and 1,4-diazabicyclo[2.2.2]-octane (DABCO or triethylenediamine).

The reaction is preferably carried out in a polar aprotic solvent such as an ether and, for example, diethyl ether, diisopropyl ether, tetrahydrofuran, dioxane, dimethoxyethane or diethyleneglycol dimethyl ether. Diethyl ether is preferred.

The reaction temperature is a function of the reactivity of the molecules present and the force of the base used. This temperature generally varies between −78° C. and ambient temperature (15-25° C.). Advantageously, a temperature of between −78° C. and −50° C. is suitable. Then, it is desirable to allow the medium to return to ambient temperature.

When the amine (IX) is a secondary amine ($R^1$ other than H), the reaction is stoichiometric; in this case, the molar ratio of the amine (IX) to the disulfide halide (VIII) is selected at between 1 and 2, better still between 1 and 1.5.

When the amine (IX) is a primary amine ($R^1$ represents H), then the quantity used depends on the nature of the desired reaction product. In order to obtain an organosilicon compound of general formula (II) in which $R^1$ represents H, the amine (IX) will be in an excess in the reaction medium. The molar ratio (IX)/(VIII) generally varies between 1 and 3, this ratio generally being the closest to 1, for example selected between 1 and 1.2.

B) Method "B"

The organosilicon compounds of general formula (II) in which x=2 may also be obtained by reacting a disulfide of formula:

(X)

in which A, $R^3$, $R^4$ and a are as defined above and J represents the succinimido or phthalimido group which may possibly be substituted, on the amine (IX) defined above, in the presence of a base, preferably an organic base. The substituents of the phthalimido and succinimido groups are organic substituents compatible with the reaction used, that is to say which are non-reactive under the operating conditions used. The bases which are usable are those defined above for method A.

Advantageously, the reaction is carried out in an aprotic polar solvent and, preferably, an aliphatic halogenated hydrocarbon (such as methylene chloride or carbon tetrachloride) or a possibly halogenated aromatic hydrocarbon (such as a possibly halogenated benzene or a toluene). Preferably, the solvent is $CCl_4$. The reaction temperature is preferably between −10° C. and 100° C., more preferably between 10° C. and 50° C. The respective quantities of compounds (IX) and (X) used depend on the type of organosilicon compound desired, just as in the previous case (method A).

Reference will therefore be made to method A for the determination of the molar quantities of (IX), (X) and of base to be reacted.

C) Method "C"

The organosilicon compounds of general formula (II) in which x=2 may also be obtained by reacting an aminosulfide of formula:

$J-S-NR^1R^2$ (XI)

in which $R^1$, $R^2$ and J are as defined above, with a thiol of formula:

(XII)

in which A, $R^3$, $R^4$ and a are as defined above, in the presence of a base, the base preferably being as defined above.

For this reaction, the reaction temperature advantageously varies between 10 and 40° C., more preferably between 15 and 30° C., for example between 18 and 25° C.

The reaction of compound (XII) on compound (XI) is generally carried out in a polar aprotic solvent as defined in the case of method B. Preferably, the solvent is benzene or toluene. The reaction is a stoichiometric reaction. However, it is preferred to operate in the presence of a slight excess of compound (XI). Thus, the molar ratio of (XI) to (XII) will generally be between 1 and 1.5, better still between 1 and 1.3.

This variant C is in particular carried out for the preparation of the organosilicon compounds of general formula (II) in which $R^1$ is other than a hydrogen atom.

The compounds of formula (VIII) may be prepared by reacting sulfur dichloride ($SCl_2$) on an appropriate mercaptosilane of formula (XII) as defined above, in the presence of an organic base, and preferably in the presence of triethylamine. This reaction is for example carried out in an ether at a temperature of −78° C. to −50° C. The organic bases and the ethers are generally as defined above.

The amines (IX) are commercial amines, or can be easily prepared from commercial products.

The compounds of formula (X) are easily prepared by reacting a thiol of formula (XII) as defined above on the halide of formula:

J—S-Hal (XIII)

where J and Hal are as defined above.

This reaction is preferably carried out in the presence of a base, in particular an organic base, at a temperature of 10° C. to 50° C., for example of from 15° C. to 30° C., in particular between 18° C. and 25° C., in a polar aprotic solvent generally as defined in method B. Preferably, the solvent is carbon tetrachloride, the base is triethylamine and the temperature is ambient temperature. This reaction is stoichiometric; nevertheless, it is desirable to operate in the presence of a deficiency of thiol (XII). Thus, the molar ratio of compound (XIII) to compound (XII) is advantageously between 1 and 1.5, better still between 1 and 1.3.

The compounds of formula (XI) are easily obtained by reacting an amine (IX) on the halide of formula (XIII), in the presence of an organic base. This reaction is preferably carried out in a solvent of halogenated hydrocarbon type (and in particular carbon tetrachloride) at a temperature generally of between 10° C. and 50° C., preferably between 15° C. and 30° C., for example between 18° C. and 25° C. (ambient temperature). As organic base, any one of the bases defined above will be selected and, for example, triethylamine. In a variant, it is possible to use the reagent (IX) as base. In this case in question, at least two equivalents of amine (IX) will be used per 1 equivalent of the halide (XIII).

The compounds of formula (XII) are commercial compounds or can be easily prepared from commercial compounds.

Diagram 1 below illustrates a synthesis path for the compound (XIII):

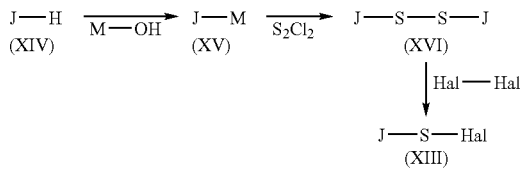

In this diagram, J and Hal are as defined above and M represents an alkali metal, preferably Na or K.

The commercial compound (XIV) is transformed into an alkali metal salt by the action of an appropriate inorganic base, M—OH, in which M is an alkali metal, of alkali metal hydroxide type in a $C_1$-$C_4$ lower alcohol such as methanol or ethanol. This reaction generally takes place at a temperature of 15° C. to 25° C. The resulting salt of formula (XV) is caused to react with $S_2Cl_2$ to yield the compound (XVI). The reaction conditions which are advantageous for this reaction are a polar aprotic solvent of the halogenated aliphatic hydrocarbon type (for example $CH_2Cl_2$, $CCl_4$) and a temperature of between −20° C. and 10° C. Then, the action of Hal-Hal on the compound (XVI) yields the expected compound (XIII). In this latter step, operation is preferably in a polar aprotic solvent of halogenated aliphatic or aromatic hydrocarbon type (such as chloroform, dichloromethane or chlorobenzene) at a temperature of between 15° C. and the reflux temperature of the solvent or above, preferably between 40° C. and 80° C., for example between 50° C. and 70° C. According to one preferred embodiment, Hal represents chlorine, in which case Hal-Hal is introduced into the reaction medium in gaseous form.

D) Method "D"

The organosilicon compounds of general formula (II) in which x=3 may be obtained by combining the following steps:

(1) reacting the thiol of formula (XII) with $S_2(Hal)_2$, where Hal represents a halogen atom, and preferably chlorine, in the presence of a base, preferably an organic base, to give:

$(R^4O)_aR^3{}_{(3-a)}Si$—A—S—S—S-Hal  (XVII)

This reaction is carried out for example in an ether at a temperature of −78° C. to −50° C. The organic bases and the ethers are generally as defined above in method A; and (2) reacting the compound (XVII) on the appropriate amine of formula (IX) in the presence of a base, preferably an organic base; for more details, reference may be made to the operating method described above with reference to the performance of method A.

E) Method "E"

The organosilicon compounds of general formula (II) in which x=4 may be obtained by combining the following steps:

(1) reacting the disulfide halide of formula (VIII) or the trisulfide halide of formula (XVII) with the required quantity of elemental sulfur [supplying 2 sulfur atoms in the case of compound (VIII) or supplying 1 sulfur atom in the case of compound (XVII)], operating at a temperature of from 70° C. to 170° C., possibly in the presence of an aromatic solvent, to give the compound of formula:

$(R^4O)_aR^3{}_{(3-a)}Si$—A—S—S—S—S-Hal  (XVIII)

(2) reacting the compound of formula (XVIII) on the appropriate amine of formula (IX) in the presence of a base, preferably an organic base; for more details, reference may be made to the operating method described above with reference to the performance of method A.

II-5. Various Additives

Of course, the rubber compositions according to the invention also comprise all or some of the additives usually used in diene rubber compositions intended for the manufacture of tires, such as, for example, plasticisers, extender oils, protective agents such as anti-ozone waxes, chemical antiozonants, antioxidants, anti-fatigue agents, adhesion promoters, coupling activators such as described for example in the aforementioned applications WO00/05300 and WO00/05301, a cross-linking system based either on sulfur or on sulfur and/or peroxide and/or bismaleimide donors, vulcanization accelerators, vulcanization activators, etc. There may also be associated with the reinforcing inorganic filler, if necessary, a conventional poorly reinforcing or non-reinforcing white filler, such as particles of clay, bentonite, talc, chalk or kaolin.

The rubber compositions according to the invention may also contain, in addition to the organosilicon compounds previously described, agents for covering the reinforcing inorganic filler, comprising for example the single Y function, or more generally processing aids liable, in known manner, owing to an improvement in the dispersion of the inorganic filler in the rubber matrix and to a reduction in the viscosity of the compositions, to improve their ability to be worked in the uncured state, these agents, being, for example, alkylalkoxysilanes, in particular alkyltriethoxysilanes, polyols, polyethers (for example polyethylene glycols), primary, secondary or tertiary amines (for example trialkanolamines), hydroxylated or hydrolysable polyorganosiloxanes, for example α,ω-dihydroxy-polyorganosiloxanes (in particular α,ω-dihydroxy-polydimethylsiloxanes).

II-6. Preparation of the Rubber Compositions

The compositions are produced in suitable mixers, using two successive preparation phases well-known to the person skilled in the art: a first phase of thermomechanical working or kneading (sometimes referred to as "non-productive" phase) at high temperature, up to a maximum temperature ($T_{max}$) of between 110° C. and 190° C., preferably between 130° C. and 180° C., followed by a second phase of mechanical working (sometimes referred to as "productive" phase) at lower temperature, typically less than 110° C., for example between 60° C. and 100° C., during which finishing phase the cross-linking or vulcanization system is incorporated; such phases have been described for example in the aforementioned applications EP-A-501 227, EP 735 088, EP 810 258, EP 881 252, WO00/05300 or WO00/05301.

The manufacturing process according to the invention is characterized in that at least the reinforcing inorganic filler and the organosilicon compound are incorporated by kneading into the diene elastomer, during the first, so-called non-productive, phase, that is to say that at least these different base constituents are introduced into the mixer and are kneaded thermomechanically, in one or more steps, until a maximum temperature of between 110° C. and 190° C., preferably between 130° C. and 180° C., is reached.

By way of example, the first (non-productive) phase is effected in a single thermomechanical step during which in a first phase all the base constituents necessary (diene elastomer, reinforcing inorganic filler and organosilicon compound), then in a second phase, for example after one to two minutes' kneading, any complementary covering agents or processing agents and other various additives, with the exception of the vulcanization system, are introduced into a suitable mixer, such as a conventional internal mixer; when the apparent density of the reinforcing inorganic filler is low (generally the case of silicas), it may be advantageous to divide the introduction thereof into two or more parts. A second step of thermomechanical working may be added in this internal mixer, after the mixture has dropped and after intermediate cooling (cooling temperature preferably less than 100° C.), with the aim of making the compositions undergo complementary thermomechanical treatment, in particular in order to improve further the dispersion, in the elastomeric matrix, of the reinforcing inorganic filler and its coupling agent. The total duration of the kneading, in this non-productive phase, is preferably between 2 and 10 minutes.

After cooling of the mixture thus obtained, the vulcanization system is then incorporated at low temperature, generally in an external mixer such as an open mill; the entire mixture is, then mixed (productive phase) for several minutes, for example between 5 and 15 minutes.

The final composition thus obtained is then calendered, for example in the form of a film or a sheet, or alternatively extruded, for example in order to form a rubber profiled element used for manufacturing semi-finished products such as treads, crown reinforcement plies, sidewalls, carcass reinforcement plies, beads, protectors, inner tubes or airtight internal rubbers for tubeless tires.

In summary, the process according to the invention for preparing an elastomeric composition usable for the manufacture of semi-finished products for tires comprises the following steps:
  incorporating in a diene elastomer, in a mixer, at least:
    a reinforcing inorganic filler;
    as (inorganic filler/diene elastomer) coupling agent, an organosilicon compound which is at least bifunctional and can be grafted onto the elastomer by means of a sulfur group,
  thermomechanically kneading the entire mixture, in one or more stages, until a maximum temperature of between 110° C. and 190° C. is reached;
  cooling the entire mixture to a temperature of less than 100° C.;
  then incorporating a cross-linking or vulcanization system;
  kneading the entire mixture until a maximum temperature of less than 120° C. is reached, said sulfur group being a group having a polythiosulfenamide function of formula (I) above, more particularly of formula (II), in particular formulae (III-1), (III-2) or (III-3), (IV), (V), (VI) or (VII).

The vulcanization (or curing) is carried out in known manner at a temperature generally between 130° C. and 200° C., preferably under pressure, for a sufficient time which may vary, for example, between 5 and 90 minutes, depending, in particular, on the curing temperature, the vulcanization system adopted, the vulcanization kinetics of the composition in question or the size of the tire.

The vulcanization system proper is preferably based on sulfur and a primary vulcanization accelerator, in particular an accelerator of the sulfenamide type. To this cross-linking system there are added, incorporated during the first non-productive phase and/or during the productive phase, various known secondary accelerators or vulcanization activators such as zinc oxide, stearic acid, guanidine derivatives (in particular diphenylguanidine), etc. The sulfur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr in particular when the invention applies to a tire tread.

The invention relates to the rubber compositions previously described, both in the "uncured" state (i.e. before curing) and in the "cured" or vulcanized state (i.e. after cross-linking or vulcanization). The compositions according to the invention may be used alone or in a blend (i.e. in a mixture) with any other rubber composition usable for manufacturing tires.

III. Examples of Embodiment of the Invention

III-1. Synthesis of the Coupling Agents

The coupling agents usable by preference in the compositions of the invention are dithiosulfenamide silanes, more preferably alkoxysilanes corresponding to one of the specific formulae (III) to (VII), synthesis methods for which are described hereafter, by way of non-limitative examples.

The melting points (Mp) expressed in degrees Celsius (° C.) are determined by projection on a KOFFLER apparatus which has been previously calibrated ($\Delta T=\pm 2°$ C.). The boiling points ($Bp_{pressure}$) are given in millibars (mbar). The 250 MHz proton ($^1$H-NMR) and carbon ($^{13}$C-NMR) spectra are recorded on a BRUCKER AC 250 spectrometer. The chemical shifts ($\delta c$ and $\delta h$) are expressed in parts per million (ppm) relative to deuterochloroform ($CDCl_3$). The coupling constants J are expressed in Hz. The following abbreviations are used: s, singlet; bs, broad singlet; d, doublet; t, triplet; q, quartet; m, multiplet.

All the manipulations with the alkoxysilanes are carried out in an inert atmosphere and under anhydrous conditions.

Example 1

In this test, N-(3-trimethoxysilylpropyldisulfanyl)-bis(isopropyl)amine, also referred to as di(isopropyl)trimethoxysilylpropyldithio-sulfenamide, is synthesised in three steps.

a) Phthalimidosulfenyl Chloride

A suspension of 0.1 mole (35.6 g) phthalimide disulfide in 350 ml chloroform is heated to 60° C. in a three-necked flask provided with magnetic stirring. A stream of chlorine gas is passed through until complete solubilisation occurs. The reaction medium is allowed to return to ambient temperature, then the solvent is evaporated at reduced pressure. The phthalimidosulfenyl chloride is recrystallised in dichloromethane.

The chloride thus synthesised, as attested by NMR analysis, has the appearance of yellow crystals and a melting point of 114° C. (yield of the reaction equals 99%).

Yield: 99%
Appearance: yellow crystals
Melting point: 114° C.
$^1$H NMR (CDCl$_3$) $\delta_H$:
7.90 (m, aromatic 2H); 8.01 (m, aromatic 2H).
$^{13}$C NMR (CDCl$_3$) $\delta_C$
124.7 (2 aromatic CH); 131.6 (2 aromatic C);
135.6 (2 aromatic CH); 165.8 (2 C=O).

b) N-(N',N'-bis(isopropyl)aminosulfanyl)phthalimide

The above phthalimidosulfenyl chloride (0.1 mol, or 21.35 g) is dissolved in 350 ml of chloroform in a three-necked flask provided with magnetic stirring and in an inert atmosphere. 0.21 mol of diisopropylamine diluted in 50 ml chloroform is added drop by drop at ambient temperature. The mixture is stirred for 3 hours then the solvent is evaporated. It is taken up with diethyl ether, the chlorohydrate of the amine is filtered then concentrated at reduced pressure.

Yield: 86%
Appearance: yellow crystals
M.p.: 88° C.
$^1$H NMR (CDCl$_3$) $\delta_H$
1.15 (d, 6H, CH$_3$); 1.21 (d, 6H, CH$_3$); 3.69 (m, 2H, CH); 7.73 (m, aromatic 2H); 7.88 (m, aromatic 2H).
$^{13}$C NMR (CDCl$_3$) $\delta_C$
22.0 (2xCH$_3$); 22.3 (2xCH$_3$); 56.6 (CH); 123.5 (2 aromatic CH);
132.3 (2 aromatic CH); 134.1 (2 aromatic CH); 169.4 (2 C=O).

c) N-(3-trimethoxysilylpropyldisulfanyl)-bis(isopropyl)amine

The sulfide obtained in the previous step (50 mmol) is dissolved in 250 ml of benzene in a three-necked flask provided with magnetic stirring and in an inert atmosphere. 3-mercaptopropyltrimethoxysilane (45 mmol) diluted in a minimum of benzene is added in one go. The mixture, being stirred, is left at ambient temperature for 48 hours. The phthalimide which has precipitated and the excess sulfide are filtered off, then the solvent is evaporated at reduced pressure.

NMR analysis and mass spectrometry reveal that the final compound thus obtained (appearance of an orange oil, yield 94%) has as its formula the aforementioned specific formula (III-1):

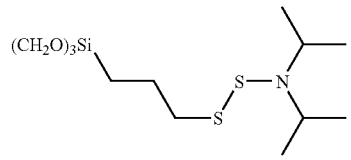

$^1$H NMR (CDCl$_3$) $\delta_H$
0.76 (t, 2H, Si—CH$_2$); 1.19 (d, 12H, CH$_3$—CH); 1.80 (m, 2H, CH$_2$); 2.94 (t, 2H, S—CH$_2$);
3.37 (p, 2H, CH$_3$—CH); 3.56 (s, 9H, —OCH$_3$).
$^{13}$C NMR (CDCl$_3$) $\delta_C$ 8.3 (Si—CH$_2$); 22.4 (CH$_3$—CH); 23.4 (CH$_2$); 42.3 (S—CH$_2$); 50.5 (—OCH$_3$);
55.8 (N—CH).

Thus an organoxysilane coupling agent of general formula (II) was prepared in which:
$R^1=R^2$=isopropyl;
A=(CH$_2$)$_3$ (propylene);
$R^4$=methyl;
a=3.

Example 2

By implementing the process of Example 1, but replacing the 3-mercaptopropyltrimethoxysilane with 3-mercaptopropyltriethoxysilane, there is obtained, as attested by NMR analysis, N-(3-triethoxysilylpropyldisulfanyl)-bis(isopropyl)amine (appearance of an orange oil, yield 92%), also referred to as di(isopropyl)triethoxysilylpropyldithio-sulfenamide, of the aforementioned specific formula (III-2):

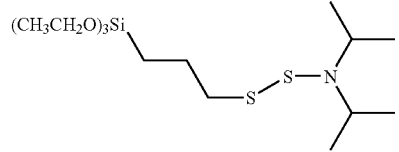

$^1$H NMR (CDCl$_3$) $\delta_H$
0.76 (t, 2H, Si—CH$_2$); 1.23 (m, 21H, CH$_3$—CH$_2$—O and CH$_3$—CH—N); 1.80 (m, 2H, CH$_2$); 2.94 (t, 2H, S—CH$_2$); 3.37 (p, 2H, CH$_3$—CH); 3.81 (q, 6H, —O—(CH$_2$).
$^{13}$C NMR (CDCl$_3$) $\delta_C$
9.7 (Si—CH$_2$); 18.3 (CH$_3$—CH$_2$—O); 22.5 (CH$_3$—CH); 23.7 (CH$_2$); 42.6 (S—CH$_2$); 55.8 (N—CH); 58.4 (—OCH$_2$).
Mass spectrum (IE 70 eV): MM=369 g mol$^{-1}$
m/z (%): 369 (30), 354 (5), 225 (32), 205 (10), 191 (25), 179 (28), 163 (53), 147 (10), 132 (20), 119 (26), 100 (12), 90 (87), 84 (55), 79 (40), 63 (22), 58 (52), 43 (100).
I.R. (KBr) cm$^{-1}$: 980, 1070, 1120, 1180, 1410, 2380, 2830.

Thus an organoxysilane coupling agent of general formula (II) was prepared in which:
$R^1=R^2$=isopropyl;
A=(CH$_2$)$_3$ (propylene);
$R^4$=ethyl;
a=3.

Example 3

In accordance with the process of Example 1, but replacing the di-isopropylamine by benzylmethylamine, there is obtained, as attested by NMR analysis, N-methyl-N-(3'-trimethoxysilylpropyldisulfanyl)benzylamine (appearance of a yellow oil, yield 95%), also referred to as (N-methyl-N-benzylamine)trimethoxysilylpropyldithio-sulfenamide, of the aforementioned specific formula (VI):

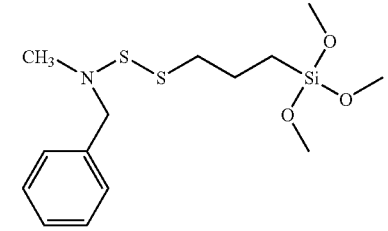

$^1$H NMR (CDCl$_3$) $\delta_H$
0.78 (t, 2H, Si—CH$_2$); 1.86 (m, 2H, CH$_2$); 2.74 (NCH$_3$); 2.89 (t, 2H, S—CH$_2$); 3.57 (s,
9H, —OCH$_3$); 4.10 (s, 2H, N—CH$_2$); 7.31 (m, aromatic 5H).

$^{13}$C NMR (CDCl$_3$) $\delta_C$ 8.2 (Si—CH$_2$); 22.2 (CH$_2$); 42.6 (S—CH$_2$); 44.9 (N—CH$_3$); 50.5 (—OCH$_3$);

64.1 (N—CH$_2$); 127.6-128.4-128.9 (5 aromatic CH); 137.4 (aromatic C).

Example 4

A solution of 100 mmol (or 10.3 g) of sulfur dichloride in 400 ml of anhydrous diethyl ether is cooled to −78° C. in a two-liter three-necked flask under an argon atmosphere. With mechanical stirring, a mixture of 3-mercaptopropyltrimethoxysilane (100 mmol) and triethylamine (100 mmol, or 10.2 g) in 150 ml of anhydrous diethyl ether is added drop by drop in one hour. The reaction medium is stirred at this temperature for one hour then a mixture of cyclohexylmethylamine (110 mmol) and triethylamine (100 mmol, or 10.2 g) in 100 ml of anhydrous diethyl ether is added drop by drop in one hour. The reaction medium is allowed to return to ambient temperature, then the triethylamine chlorohydrate is filtered and concentration is carried out at reduced pressure. Distillation at reduced pressure makes it possible to remove the traces of unreacted reagents.

As attested by NMR analysis, there is thus obtained N-methyl-N-(3-triethoxysilylpropyldisulfanyl)cyclohexylamine (appearance of a yellow oil, yield 85%), also referred to as (N-methyl-N-cyclohexylamine)triethoxysilylpropyldithio-sulfenamide, of the aforementioned specific formula (VII):

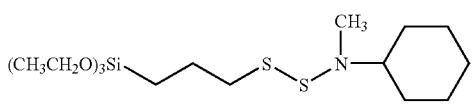

$^1$H NMR (CDCl$_3$) $\delta_H$ 0.75 (t, 2H, Si—CH$_2$); 1.18 (m, 1H, 3xCH$_3$ and CH$_2$); 1.68-1.95 (m, 6H, CH$_2$); 2.28

(m, 2H, CH$_2$); 2.30 (m, 2H, CH$_2$); 2.90 (t, 2H, SCH$_2$); 3.05 (m, 1H, NCH); 3.15 (s, 3H, NCH$_3$); 3.81 (q, 6H, —O—(CH$_2$).

$^{13}$C NMR (CDCl$_3$) $\delta_C$ 9.5 (Si—CH$_2$); 18.2 (CH$_3$); 22.2 (CH$_2$); 26.7 (CH$_2$); 25.9 (2×CH$_2$); 32.8 (2×CH$_2$);

41.6 (S—CH$_2$); 45.9 (N—CH$_3$); 58.4 (—OCH$_2$); 60.2 (N—CH).

Example 5

By implementing the operating procedure of Example 4, but replacing the cyclohexylmethylamine by benzylamine, there is obtained, as attested by NMR analysis, N-(3-triethoxysilylpropyldisulfanyl)benzylamine (appearance of a yellow oil, yield 88%), also referred to as (N-benzylamine)triethoxysilylpropyldithio-sulfenamide, of the aforementioned specific formula (IV):

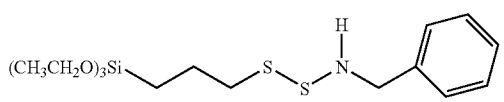

$^1$H NMR (CDCl$_3$) $\delta_H$ 0.74 (t, 2H, Si—CH$_2$); 1.21 (t, 9H, CH$_3$); 1.77 (m, 2H, CH$_2$); 2.91 (t, 2H, S—CH$_2$);

3.80 (q, 9H, OCH$_2$); 4.10 (s, 2H, S—CH$_2$); 7.29 (m, aromatic 5H).

$^{13}$C NMR (CDCl$_3$) $\delta_C$ 9.5 (Si—CH$_2$); 22.1 (CH$_2$); 41.2 (S—CH$_2$); 58.4 (—OCH$_2$); 60.5 (N—CH$_2$);

127.5-128.5-129.1 (5 aromatic CH); 137.4 (Aromatic C).

Example 6

A solution of 110.4 mmol (11.34 g) of sulfur dichloride in 500 ml of anhydrous diethyl ether is cooled to −90° C. in a two-liter three-necked flask under an argon atmosphere. With mechanical stirring, a mixture of 3-mercaptopropyltrimethoxysilane (104.9 mmol; 20.56 g) and triethylamine (104.9 mmol; 10.61 g) in 100 ml of anhydrous diethyl ether is added drop by drop in one hour. The reaction medium is stirred at −90° C. for one hour, then a mixture of cyclohexylamine (209.8 mmol; 20.80 g) and triethylamine (104.9 mole; 10.61 g) in 100 ml of anhydrous diethyl ether is added drop by drop in one hour.

It is stirred for 12 hours, allowing the reaction medium to return to ambient temperature, then the precipitated triethylamine chlorohydrate is filtered, the precipitate is washed with anhydrous diethyl ether and concentration is carried out at reduced pressure. Distillation at reduced pressure makes it possible to eliminate the excess triethylamine and cyclohexylamine, and thus to isolate 30 g of the desired compound.

There is thus obtained (yield 88%; appearance of a yellow oil) the N-(3-triethoxysilyl-propyldisulfanyl)-cyclohexylamine or (N-cyclohexylamine)-trimethoxysilylpropyldithio-sulfenamide of the aforementioned formula (V):

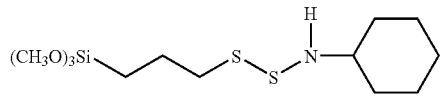

Mass spectrum (IE 70 eV): MM=325 g mol$^{-1}$ in accordance with the structure (in which Me=CH$_3$):

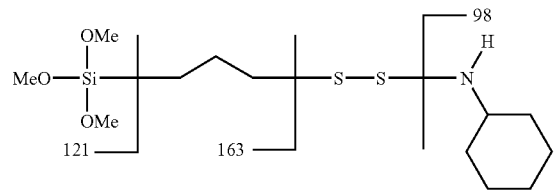

Example 7

In this test, N-(3-ethoxydimethylsilylpropyldisulfanyl)-bis(isopropyl)amine, or di(isopropyl)ethoxydimethylsilylpropyldithio-sulfenamide, is synthesised in four steps.

a) phthalimidosulfenyl Chloride

It is prepared as indicated in Example 1a above.

b) N-(N',N'-bis(isopropyl)aminosulfanyl)phthalimide

It is prepared as indicated in Example 1b above.

c) 3-mercaptopropyldimethylethoxysilane

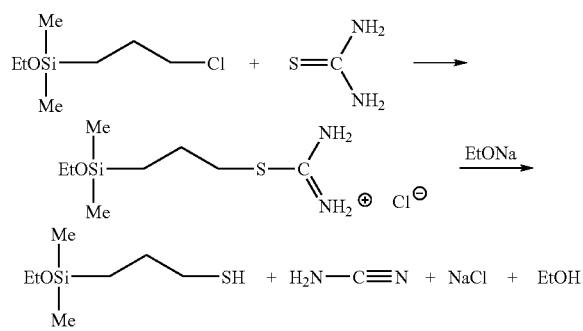

1133 ml of ethanol, 300 g of thiourea (3.922 moles), 2.42 g of NaI (25.58 mmol) and 711.5 g of chloropropyldimethylethoxysilane (3.942 moles) are introduced into a 5-liter dual-casing reactor provided with a mechanical stirring means. The medium is stirred and brought to reflux for 20 hours. 1273.8 g of a solution of sodium ethylate (21% EtONa in ethanol, 3.934 moles of EtONa) is then poured in at this temperature over a period of 10 minutes.

The reaction medium is left under these conditions for 3 hours. A precipitate appears. The reaction medium is allowed to return to ambient temperature, it is filtered and the ethanol is evaporated. A yellow oil is obtained. It is distilled at reduced pressure.

Yield: 34%

$Bp_{4\,mbar} = 58°$ C.

Appearance: colourless oil $^1$H NMR (CDCl$_3$) $\delta_H$

−0.01 (s, 6H, Si—CH$_3$); 0.57 (m, 2H, CH$_2$); 1.05 (t, 3H, CH$_3$); 1.55 (m, 2H, CH$_2$—CH$_2$); 2.42 (t, 2H, —S—CH$_2$); 3.55 (q, 2H, CH$_2$O).

d) N-(3-ethoxydimethylsilylpropyldisulfanyl)-bis(isopropyl)amine

The N-(N',N'-bis(isopropyl)aminosulfanyl)phthalimide (30.51 g, or 109.7 mmol) is dissolved in the dichloromethane (600 ml) in a three-necked flask provided with magnetic stirring and in an inert atmosphere. The 3-mercaptopropylethoxy-dimethylsilane (18.02 g, or 101 mmol) is added at ambient temperature at a flow rate of 5 ml/min. It is left, while being stirred, at ambient temperature for 20 hours. The phthalimide which had precipitated is filtered off, then the solvent is evaporated at reduced pressure. The paste obtained is taken up in toluene. The phthalimide which precipitated and the excess sulfide are filtered off, then evaporation is carried out at reduced pressure.

The compound obtained (appearance: yellow oil—yield: 82%) corresponds to the aforementioned formula (III-3):

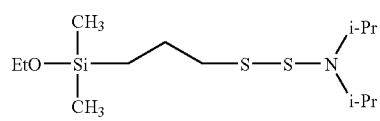

$^1$H NMR (CDCl$_3$) $\delta_H$ 0.11 (s, 6H, Si—CH$_3$); 0.67 (m, 2H, Si—CH$_2$); 1.16-1.21 (several signals, 15H, CH$_2$—CH$_3$+CH—CH$_3$); 1.73 (m, 2H, CH$_2$); 2.92 (m, 2H, S—CH$_2$); 3.38 (m, 2H, CH); 3.66 (q, 2H, CH$_2$O).

III-2. Preparation of the Rubber Compositions

For the following tests, the procedure is as follows: the diene elastomer (or the mixture of diene elastomers, if applicable), the reinforcing filler, the coupling agent, then, after one to two minutes' kneading, the various other ingredients, with the exception of the vulcanization system, are introduced into an internal mixer filled to 70%, the initial tank temperature of which is approximately 60° C. Thermomechanical working (non-productive phase) is then performed in two stages (total duration of kneading equal to about 7 minutes), until a maximum "dropping" temperature of about 165° C. is reached. The mixture thus obtained is recovered, it is cooled and then the vulcanization system (sulfur and sulfenamide accelerator) is added on an external mixer (homo-finisher) at 30° C., by mixing everything (productive phase) for 3 to 4 minutes.

The compositions thus obtained are then calendered either in the form of thin slabs (thickness of 2 to 3 mm) or thin sheets of rubber in order to measure their physical or mechanical properties, or in the form of profiled elements usable directly, after cutting out and/or assembling to the desired dimensions, for example as semi-finished products for tires, in particular as tire treads.

In the following tests, the diene elastomer is a SBR/BR blend and the reinforcing inorganic filler (HD silica) is used in a preferred amount lying within a range from 50 to 120 phr.

III-3. Characterization of the Rubber Compositions

A) Test No. 1

The object of this test is to demonstrate the improved (inorganic filler/diene elastomer) coupling performance in a composition according to the invention, compared with a composition of the prior art using a conventional TESPT coupling agent:

composition No. 1: conventional TESPT silane;

composition No. 2: dithiosulfenamide silane of formula III-2.

It will be recalled that TESPT is bis(3-triethoxysilylpropyl) tetrasulfide, of formula $[(C_2H_5O)_3Si(CH_2)_3S_2]_2$; it is sold, for example, by Degussa under the name Si69 (or X50S when it is supported to 50% by weight on carbon black), or alternatively by Witco under the name Silquest A1289 (in both cases, a commercial mixture of polysulfides $S_x$ having an average value of x which is close to 4).

The structural formula of TESPT is:

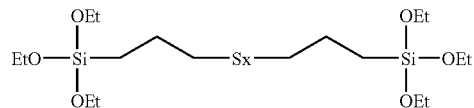

This formula should be compared to that of the di(isopropyl)triethoxysilylpropyldithio-sulfenamide of formula III-2:

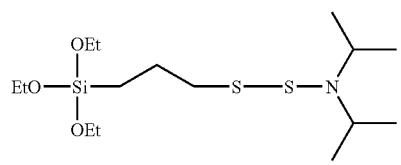

It will be noted that part of the two chemical structures above is identical (Y function—here Si(OEt)$_3$—and hydrocarbon group A—here propylene chain—making it possible to join Y and X), the only difference lying in the nature of the sulfur function (X function) which can be grafted onto the diene elastomer: polysulfide group Sx for the conventional composition, dithiosulfenamide group for the composition of the invention.

The two coupling agents are used here in an isomolar amount of silicon, that is to say that, whatever the composition, the same number of moles of Y functions (here Y=Si(OEt)$_3$) which are reactive with respect to the silica and its hydroxyl surface groups is used.

Relative to the weight of reinforcing inorganic filler, the amount of coupling agent is in both cases less than 10 phr, which represents less than 15% by weight relative to the quantity of reinforcing inorganic filler.

Tables 1 and 2 show the formulation of the different compositions (Table 1—amounts of the different products expressed in phr), and their properties before and after curing (40 min at 150° C.). The appended FIGURE shows the curves of modulus (in MPa) as a function of the elongation (in %), these curves being marked C1 and C2, and corresponding to compositions No. 1 and No. 2 respectively.

Examination of the different results leads to the following observations:
- the scorching time (T5) is advantageously shortened (−5 min) for the composition of the invention (C-2), while remaining sufficiently long (more than 10 min) to offer a significant safety margin with respect to the problem of scorching;
- the value of Mooney plasticity, which is already low (approximately 80 MU) for the control composition, is unexpectedly distinctly reduced (−23%) for the composition of the invention (C-2), which is an indicator of an excellent ability of the compositions of the invention to be processed in the uncured state;
- after curing, equally unexpectedly, it will be noted that the composition of the invention (C-2) has the highest values of modulus, in particular at high deformation (moduli ME100 and ME300), which is a known indicator for the person skilled in the art of the quality of the reinforcement provided by the inorganic filler and its associated coupling agent.

As for the attached FIGURE, it confirms the preceding observations: the composition of the invention (curve C2), compared with the control composition (curve C1), reveals a level of reinforcement (modulus) which is higher whatever the amount of elongation, in particular at high deformation (elongations of 100% and more); for such a range of elongations, this behaviour clearly illustrates a better quality of the bond or coupling between the reinforcing inorganic filler and the diene elastomer, which is an indicator of very good ability of the composition of the invention to resist wear.

B) Test No. 2

In this new test, the improved performances of a composition according to the invention are again demonstrated compared with two compositions of the prior art using known coupling agents.

The three compositions tested are identical except for the following differences:
- composition No. 3: TESPT silane (control);
- composition No. 4: dithiosulfenamide silane of formula XIX (not in accordance with the invention);
- composition No. 5: dithiosulfenamide silane of formula III-3 (invention).

The two dithiosulfenamide silanes have very close formulae, their structures differing essentially in the nature of their radicals R$^1$ and R$^2$:

di(ethyl)triethoxysilylpropyldithio-sulfenamide of formula (XIX) (Et=ethyl):

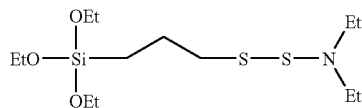

di(isopropyl)ethoxydimethylsilylpropyldithio-sulfenamide of formula III-3 (Pr=propyl):

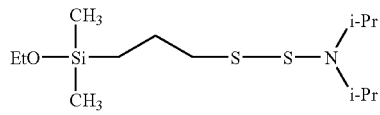

It will be noted that the silane of formula (XIX) does not meet the conditions required by the invention, owing to the nature of its radicals R$^1$ and R$^2$ (ethyl instead of C$_3$-C$_8$ alkyl).

Such a silane of formula (XIX) has been described in particular in U.S. Pat. No. 4,292,234 and embodied as a coupling agent in elastomeric compositions reinforced with silica (see table IV).

It was synthesised from phthalimidosulfenyl chloride (prepared as for Example 1a), from N-(N',N'-bis(ethyl)aminosulfanyl)phthalimide (prepared as for Example 1b, but replacing the diisopropylamine with diethylamine), in accordance with the process described in Example 7 step d), replacing the 3-mercaptopropylethoxydimethylsilane with commercially available 3-mercaptopropyltriethoxysilane (appearance of an orange oil—yield: 88%):

$^1$H NMR (CDCl$_3$) δ$_H$ 0.72 (m, 2H, Si—CH$_2$); 1.14-1.25 (several signals, 15H, O—CH$_2$—CH$_3$,$^+$N—CH$_2$—CH$_3$);

1.80 (m, 2H, CH$_2$—CH$_2$); 2.83-2.90 (several signals, 6H, N—CH$_2$+—S—CH$_2$); 3.81 (q,

6H, CH$_2$O).

As previously for Test No. 1, the three coupling agents tested are used with an isomolar amount of silicon, that is to say that, whatever the composition, the same number of moles of Y functions [Si(OEt)$_3$ or Si(OEt)Me$_2$ depending on the case] which are reactive with respect to the hydroxyl surface groups of the silica is used. In all cases, the amount of coupling agent is less than 10 phr (or less than 15% by weight relative to the quantity of silica).

Tables 3 and 4 show the formulation of the different compositions (Table 3—amounts of the different products expressed in phr), and their properties before and after curing (40 min at 150° C.), and also the rheometric properties at 150° C.

On reading the results of Table 4, it will be noted that the composition according to the invention, compared with the two control compositions, has numerous improved characteristics:
- a scorching time (T5) less than that of composition C-3, while remaining advantageously greater than 10 min (composition C-4);
- a Mooney plasticity value which is very distinctly reduced, both compared with the reference composition C-3 (reduction of 23%, as previously observed for test No. 1) and relative to the other control composition C-4;
- substantially improved rheometric properties, both in terms of curing time (shorter, see T$_{99}$-T$_i$), vulcanization yield (higher, see Δtorque) and curing kinetics (faster, see constant K);
- finally, values of moduli at high elongation (moduli ME100 and ME300) which are at least as high.

In conclusion, the coupling agent selected for the compositions according to the invention imparts to the latter high reinforcement properties, excellent processing properties in the uncured state owing to reduced plasticity, a very good ability to be vulcanized, which thus reveals an overall effectiveness greater than that of TESPT, which is the coupling agent of reference in diene rubber compositions reinforced with an inorganic filler such as a reinforcing silica, and than that of the dithiosulfenamide silane described in the aforementioned document U.S. Pat. No. 4,292,234.

The invention can be applied particularly advantageously in rubber compositions intended for the manufacture of treads for tires which have both low rolling resistance and high wear resistance, in particular when these treads are intended for tires for passenger vehicles, motorcycles or industrial vehicles of the heavy-vehicle type.

TABLE 1

| Composition No. | C-1 | C-2 |
| --- | --- | --- |
| SBR (1) | 88.5 | 88.5 |
| BR (2) | 25 | 25 |
| silica (3) | 80 | 80 |
| aromatic oil (4) | 21.5 | 21.5 |
| alkoxysilane (5) | 6.4 | — |
| alkoxysilane (6) | — | 8.8 |
| ZnO | 2.5 | 2.5 |
| DPG (7) | 1.5 | 1.5 |
| stearic acid | 2 | 2 |
| paraffin | 1.5 | 1.5 |
| antioxidant (8) | 1.9 | 1.9 |
| Sulphur | 1.1 | 1.1 |
| accelerator (9) | 2 | 2 |

(1) solution SBR with 57% of 1,2-polybutadiene units; 25% of styrene; Tg = −26° C.; 75 phr SBR extended with 13.5 phr of aromatic oil (or a total of 88.5 phr);
(2) BR with 4.3% of 1-2; 2.7% of trans; 93% of cis 1-4 (Tg = −104° C.);
(3) silica type "HD" - "Zeosil 1165 MP" from RHODIA in the form of microbeads (BET and CTAB: approximately 150-160 m$^2$/g);
(4) oil "Enerflex 65" from BP;
(5) TESPT ("Si69" from DEGUSSA);
(6) dithiosulfenamide silane, of formula (III-2);
(7) diphenylguanidine ("Vulkacit D" from BAYER);
(8) N-1,3-dimethylbutyl-N-phenyl-para-phenylenediamine ("Santoflex 6-PPD" from FLEXSYS);
(9) N-cyclohexyl-2-benzothiazyl sulfenamide ("Santocure CBS" - from FLEXSYS).

TABLE 2

| Composition No. | C-1 | C-2 |
| --- | --- | --- |
| Properties before curing: | | |
| ML1 + 4 (MU) | 81 | 63 |
| T5 (min) | 22 | 17 |
| Properties after curing: | | |
| ME10 (MPa) | 5.6 | 7.0 |
| ME100 (MPa) | 1.9 | 2.4 |
| ME300 (MPa) | 2.4 | 3.0 |
| breaking stress (MPa) | 21.9 | 20.9 |
| elongation at break (%) | 527 | 455 |

TABLE 3

| Composition No. | C-3 | C-4 | C-5 |
| --- | --- | --- | --- |
| SBR (1) | 88.5 | 88.5 | 88.5 |
| BR (2) | 25 | 25 | 25 |
| silica (3) | 80 | 80 | 80 |
| Aromatic oil (4) | 21.5 | 21.5 | 21.5 |
| alkoxysilane (5) | 6.4 | — | — |

TABLE 3-continued

| Composition No. | C-3 | C-4 | C-5 |
| --- | --- | --- | --- |
| alkoxysilane (10) | — | 8.3 | — |
| alkoxysilane (11) | — | — | 7.5 |
| ZnO | 2.5 | 2.5 | 2.5 |
| DPG (7) | 1.5 | 1.5 | 1.5 |
| stearic acid | 2 | 2 | 2 |
| paraffin | 1.5 | 1.5 | 1.5 |
| antioxidant (8) | 1.9 | 1.9 | 1.9 |
| Sulphur | 1.1 | 1.1 | 1.1 |
| accelerator (9) | 2 | 2 | 2 |

(1) to (9) idem Table No. 1;
dithiosulfenamide silane, of formula (XIX);
dithiosulfenamide silane, of formula (III-3);

TABLE 4

| Composition No. | C-3 | C-4 | C-5 |
| --- | --- | --- | --- |
| Properties before curing: | | | |
| ML1 + 4 (MU) | 98 | 87 | 76 |
| T5 (min) | 17 | 10 | 12 |
| Rheometric properties: | | | |
| $T_i$ (min) | 7.6 | 5.1 | 5.8 |
| $T_{99}$ (min) | 37 | 31 | 28 |
| $T_{99} - T_i$ (min) | 29 | 26 | 22 |
| Δtorque (denim) | 17.5 | 18.7 | 19.9 |
| K (min$^{-1}$) | 0.157 | 0.180 | 0.206 |
| Properties after curing: | | | |
| ME10 (MPa) | 5.9 | 6.4 | 6.9 |
| ME100 (MPa) | 1.9 | 2.1 | 2.3 |
| ME300 (MPa) | 2.4 | 2.7 | 2.7 |
| breaking stress (MPa) | 21.6 | 22.1 | 20.7 |
| elongation at break (%) | 508 | 466 | 492 |

What is claimed is:

1. A tire comprising an elastomeric composition based on a diene elastomer, between 30 phr and 140 phr of silica as an inorganic filler and between 2 phr and 20 phr of a coupling agent comprising an organosilicon compound which is at least bifunctional and has a polythiosulfenamide function, and can be grafted on to the elastomer by means of a sulfur group, and which is selected from the group consisting of di(isopropyl)triethoxysilylpropyldithio-sulfenamide, di(isopropyl)ethoxydimethylsilylpropyldithio-sulfenamide, and mixtures of these compounds.

2. The tire according to claim 1, wherein the diene elastomer is selected from the group consisting of polybutadienes, synthetic polyisoprenes, natural rubber, butadiene copolymers, isoprene copolymers and mixtures of these elastomers.

3. The tire according to claim 1, wherein the inorganic filler is used in a mixture with carbon black.

4. The tire according to claim 3, wherein the amount of carbon black is between 2 and 20 phr.

5. The tire according to claim 1, wherein the coupling agent comprises di(isopropyl)ethoxydimethylsilylpropyldithio-sulfenamide of formula (III-3):

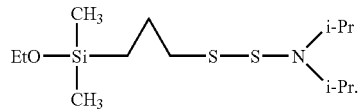

* * * * *